US006742142B2

United States Patent
Takasugi et al.

(10) Patent No.: US 6,742,142 B2
(45) Date of Patent: May 25, 2004

(54) EMULATOR, A DATA PROCESSING SYSTEM INCLUDING AN EMULATOR, AND METHOD OF EMULATION FOR TESTING A SYSTEM

(75) Inventors: Mikio Takasugi, Kanagawa-ken (JP); Shigeaki Iwasa, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 579 days.

(21) Appl. No.: 09/748,284

(22) Filed: Dec. 27, 2000

(65) Prior Publication Data

US 2001/0016922 A1 Aug. 23, 2001

(30) Foreign Application Priority Data

Dec. 27, 1999 (JP) .......................... P11-371736

(51) Int. Cl.⁷ ................................. G06F 11/00
(52) U.S. Cl. ........................ 714/29; 712/244
(58) Field of Search ............... 714/29, 30, 32, 714/33, 35, 37, 39, 27, 28; 712/244, 245, 227

(56) References Cited

U.S. PATENT DOCUMENTS

| | | | | |
|---|---|---|---|---|
| 4,868,822 A | * | 9/1989 | Scott et al. ................... 714/29 |
| 4,982,360 A | * | 1/1991 | Johnson et al. ............. 711/108 |
| 5,774,695 A | * | 6/1998 | Autrey et al. ................ 703/26 |
| 5,911,059 A | * | 6/1999 | Profit, Jr. ..................... 703/23 |
| 5,951,704 A | | 9/1999 | Sauer et al. | |
| 6,085,244 A | * | 7/2000 | Wookey ....................... 709/224 |
| 6,522,985 B1 | * | 2/2003 | Swoboda et al. ........... 702/117 |
| 6,564,339 B1 | * | 5/2003 | Swoboda et al. ............. 714/30 |
| 6,567,933 B1 | * | 5/2003 | Swoboda et al. ............. 714/31 |

FOREIGN PATENT DOCUMENTS

| | | |
|---|---|---|
| JP | 5-189267 | 7/1993 |
| JP | 8-147184 | 6/1996 |

* cited by examiner

*Primary Examiner*—Nadeem Iqbal
(74) *Attorney, Agent, or Firm*—Oblon, Spivak, McClelland, Maier & Neustadt, P.C.

(57) ABSTRACT

The present invention is to provide an emulator and a method of emulation for using testing a system having complex interfaces capable of stable testing can be realize under the system regulation frequency or less frequency without using the high-performance and expensive tester. The emulator comprises a content addressable memory (CAM) configured to store addresses accessed by a system to be tested, a memory unit having storage area corresponding to the entry of the CAM, configured to store data corresponding to the address stored in the CAM, and test information for emulation, a shift register configured to store data and test information from a tester and transfer the data and the test information to the CAM and the memory unit, and a state machine configured to receive a request from a system or a tester and control transferring between a system and a tester.

15 Claims, 6 Drawing Sheets

EMULATOR, A DATA PROCESSING SYSTEM INCLUDING AN EMULATOR, AND METHOD OF EMULATION FOR TESTING A SYSTEM

CROSS REFERENCE TO RELATED APPLICATIONS

This application claims benefit of priority under 35 USC 119 based on Japanese patent application PH11-371736 filed Dec. 27, 1999, the entire contents of which are incorporated by reference herein.

BACKGROUND OF THE INVENTION

1. Field of the Invention

The present invention relates to an emulator and a method of emulation for using testing a system having complex interfaces such as RAMBUS interface or DRAM interface.

2. Description of Related Art

System LSIs (Large Scale Integration) and microprocessors are directed much research to method of so-called system on-chip. High-speed and low amplitude memory interfaces such as RAMBUS I/F (Interface) or DRAM I/F have become the de-facto standard for memory interfaces.

FIG. 1 illustrates a system chip having a RAMBUS I/F and a DRAM I/F. In FIG. 1, this system chip 100 comprises a CPU 101 connected to a system bus 102, a RAMBUS I/F 103, and a DRAM I/F 104 connected to the system bus 102. The RAMBUS I/F 103 and DRAM I/F 104 are connected to a tester 105. The tester 105 outputs and inputs data to/from the system chip 100 via these I/Fs.

In such case, it becomes very difficult to test under the regulation frequency employing conventional tester since the system chip having complex interfaces such as the RAMBUS I/F 103 or DRAM I/F 104 is getting more complex, i.e. higher transfer speed and lower amplitude. On the other hand, the stable testing could not be realized even if the test could carry out. Or these tests need to be employed a high-performance, expensive and inflexible tester.

FIG. 2 illustrates a system chip having a scan register 112. In FIG. 2, the scan register 112 is used for scanning the internal status of the system chip 110. The scan register 112 is provided between the system bus 113 and the CPU 111 to store the test vector and the result. To examine the internal status of the system chip 110, the system chip 110 had to be suspended, and then the stored test results in the scan register 112 are shifted to the tester 115 via RAMBUS 115.

The test using the scan register may cause failure since the system chip has special I/Fs like RAMBUS I/F as mentioned above. And it is impossible to test depending on operation frequency of the system chip since the system chip must be suspended.

SUMMARY OF THE INVENTION

The present invention is to provide an emulator and a method of emulation for using testing a system having complex interfaces capable of stable testing can be realize under the system regulation frequency or less frequency without using the high-performance and expensive tester.

The emulator of this invention comprises a content addressable memory (CAM) configured to store addresses accessed by a system to be tested, a memory unit having storage area corresponding to the entry of the CAM, configured to store data corresponding to the address stored in the CAM and test information for emulation, a shift register configured to store data and test information from a tester and transfer the data and the test information to the CAM and the memory unit, and a state machine configured to receive a request from a system or a tester and control transferring between a system and a tester.

BRIEF DESCRIPTION OF THE DRAWINGS

The objects, features, and advantages of the present invention will become more apparent from the following description of the preferred embodiments taken in conjunction with the accompanying drawings, in which.

DESCRIPTION OF THE PREFERRED EMBODIMENTS

Figure 1:
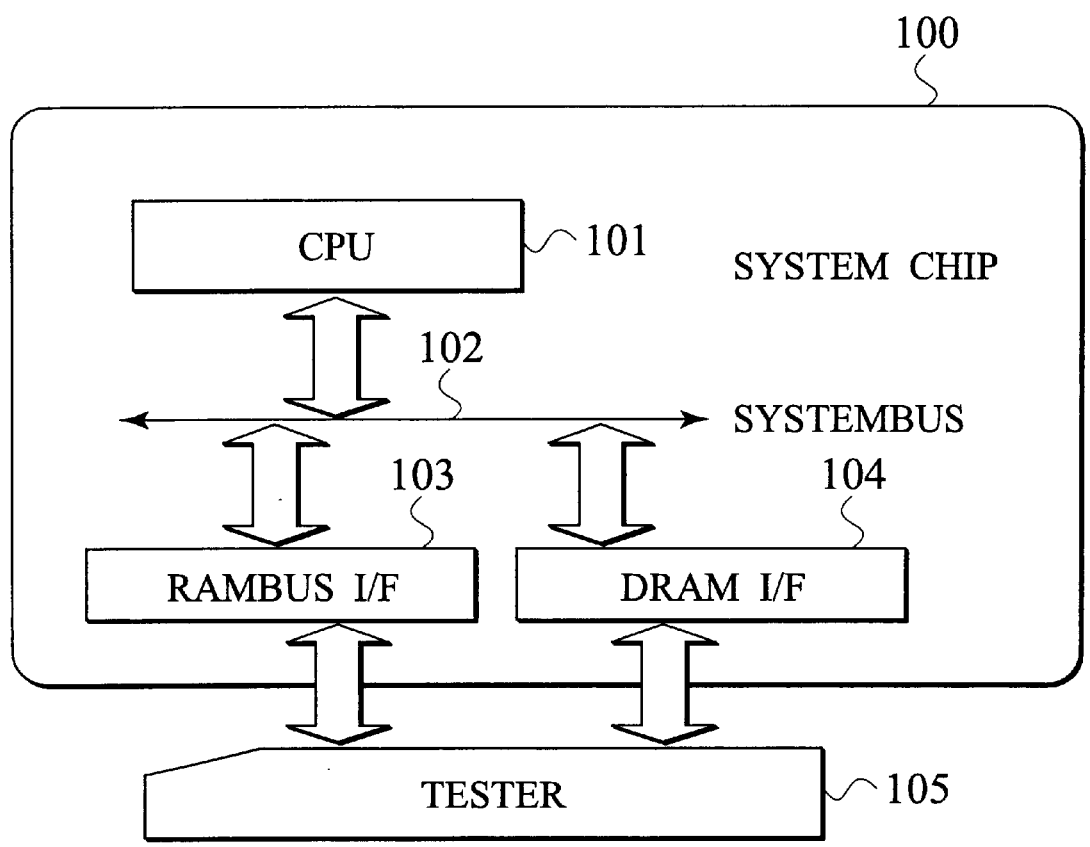
FIG. 1 illustrates a system chip having RAMBUS I/F and DRAM I/F.
Figure 2:
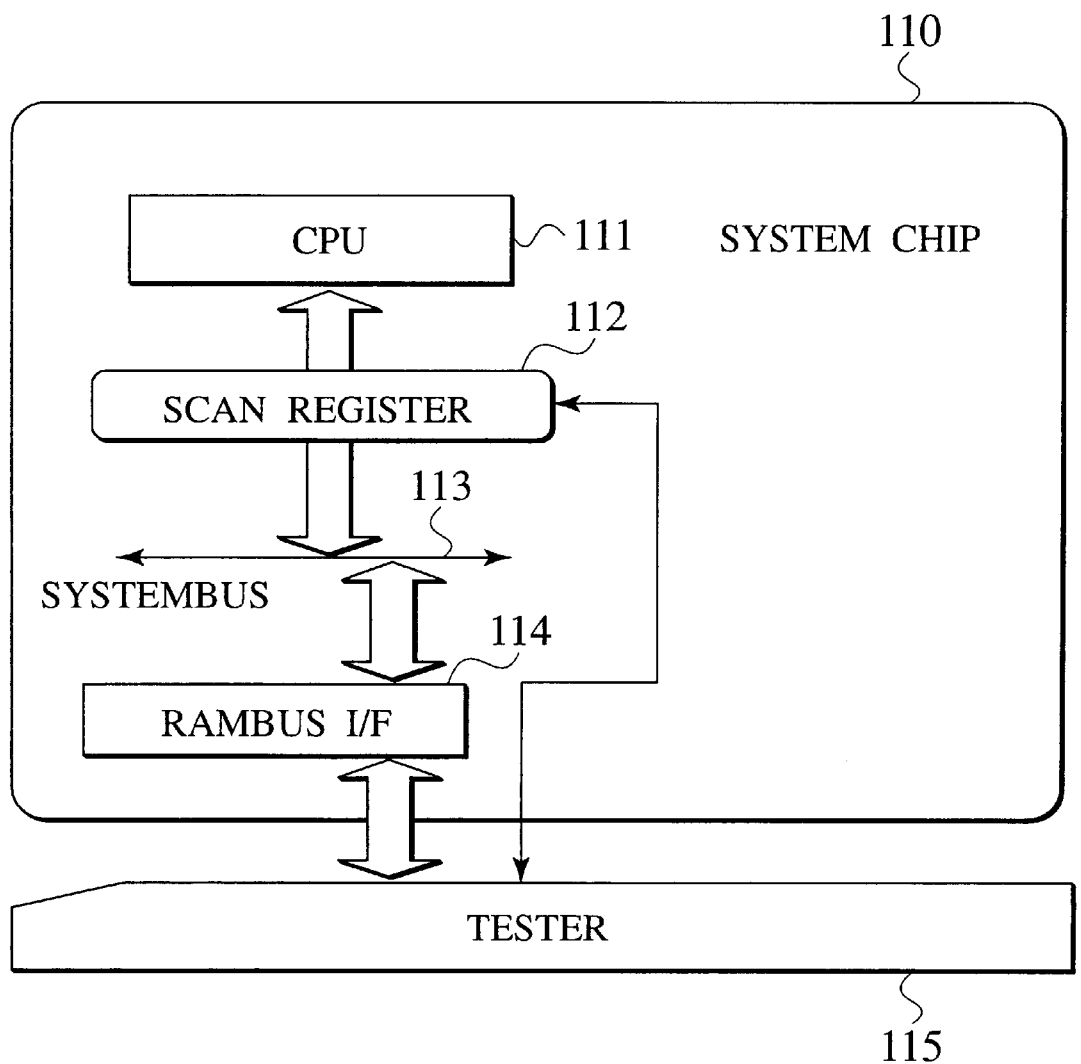
FIG. 2 illustrates a system chip having a scan register 112.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 3:
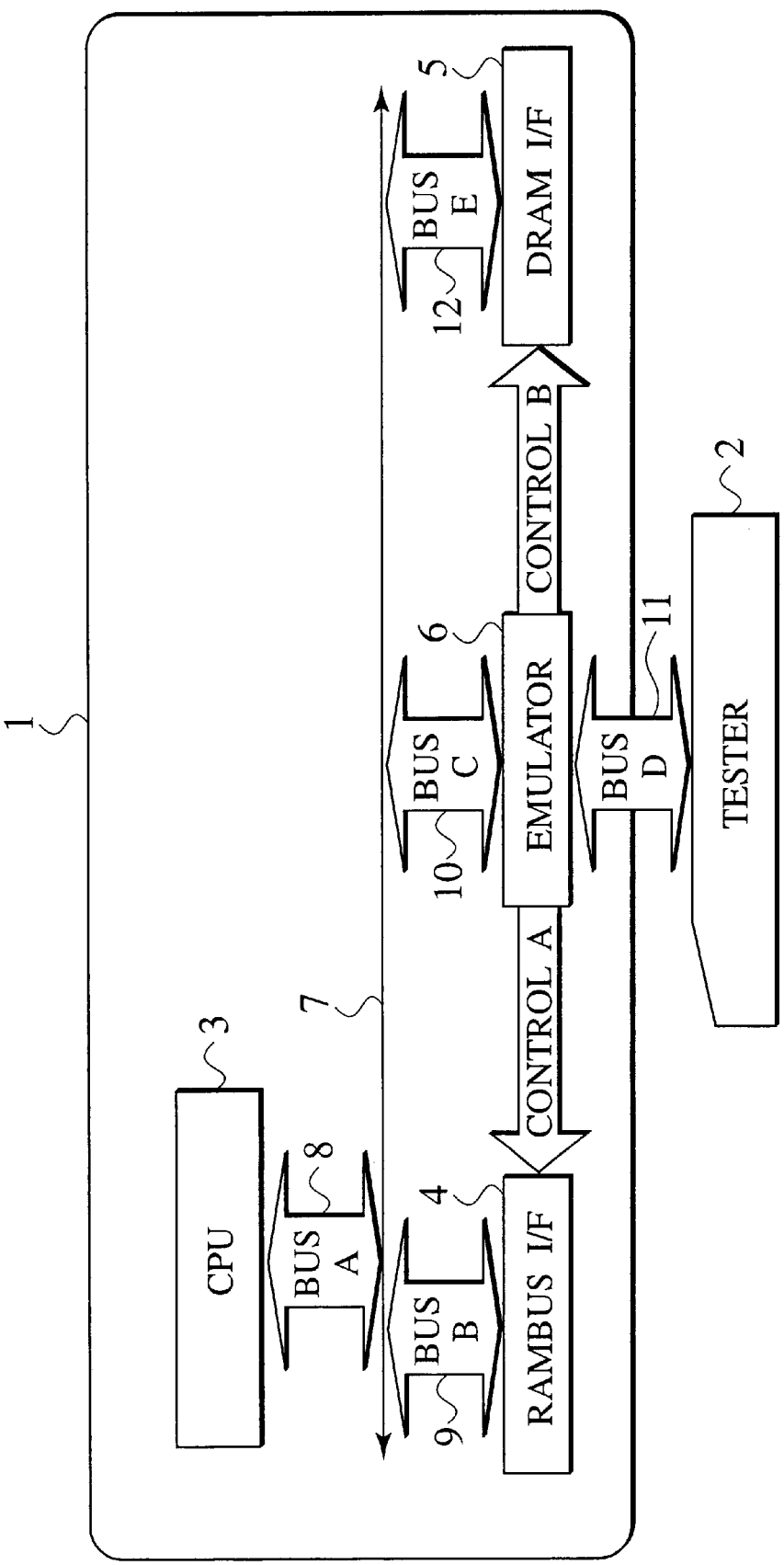
FIG. 3 illustrates a data processing system having the emulator according to an embodiment of the present invention.

FIG. 3 illustrates a data processing system 1 having an emulator according to an embodiment of the present invention. A tester 2 set outside of the data processing system 1 tests a data processing system 1. The data processing system 1 comprises a CPU (Central Processing Unit) 3 for processing data, a system interfaces 4 and 5 for interfacing with external memory interface(s), and an emulator 6 for inputting and outputting data between the data processing system 1 and the tester 2. In this embodiment, the data processing system has two I/F that are RAMBUS I/F 4 and DRAM I/F 5. The data processing system also comprises a system bus 7, a bus A8 for transmitting data between the system bus 7 and the CPU 3, a bus B9 for transmitting data between the system bus 7 and the RAMBUS I/F 4, a bus C10 for transmitting data between the system bus 7 and the emulator 6, a bus D11 for transmitting data between the emulator 6 and the tester 2, and a bus E12 for transmitting data between the system bus 7 and the DRAM I/F 5.

The emulator 6 substitutes for a computer device for the purpose of testing and operates in cooperating with the data processing system 1. The emulator 6 outputs control signals A and B to control the RAMBUS I/F 4 and the DRAM I/F 5. The RAMBUS I/F 4 and the DRAM I/F 5 are suspended when they receive the control signal from the emulator 6. The bus C10 connected the system bus 7 and the emulator 6 may be an ordinary bus capable of transmitting at lower frequency than the system bus interface such as the RAMBUS I/F or the DRAM I/F 5. Therefore, inexpensive and stable test of the data processing system can be realized. The bus C10 transmits data to the emulator 6. The data are originally transmitted by the bus B9 or the bus E12.

Figure 4:
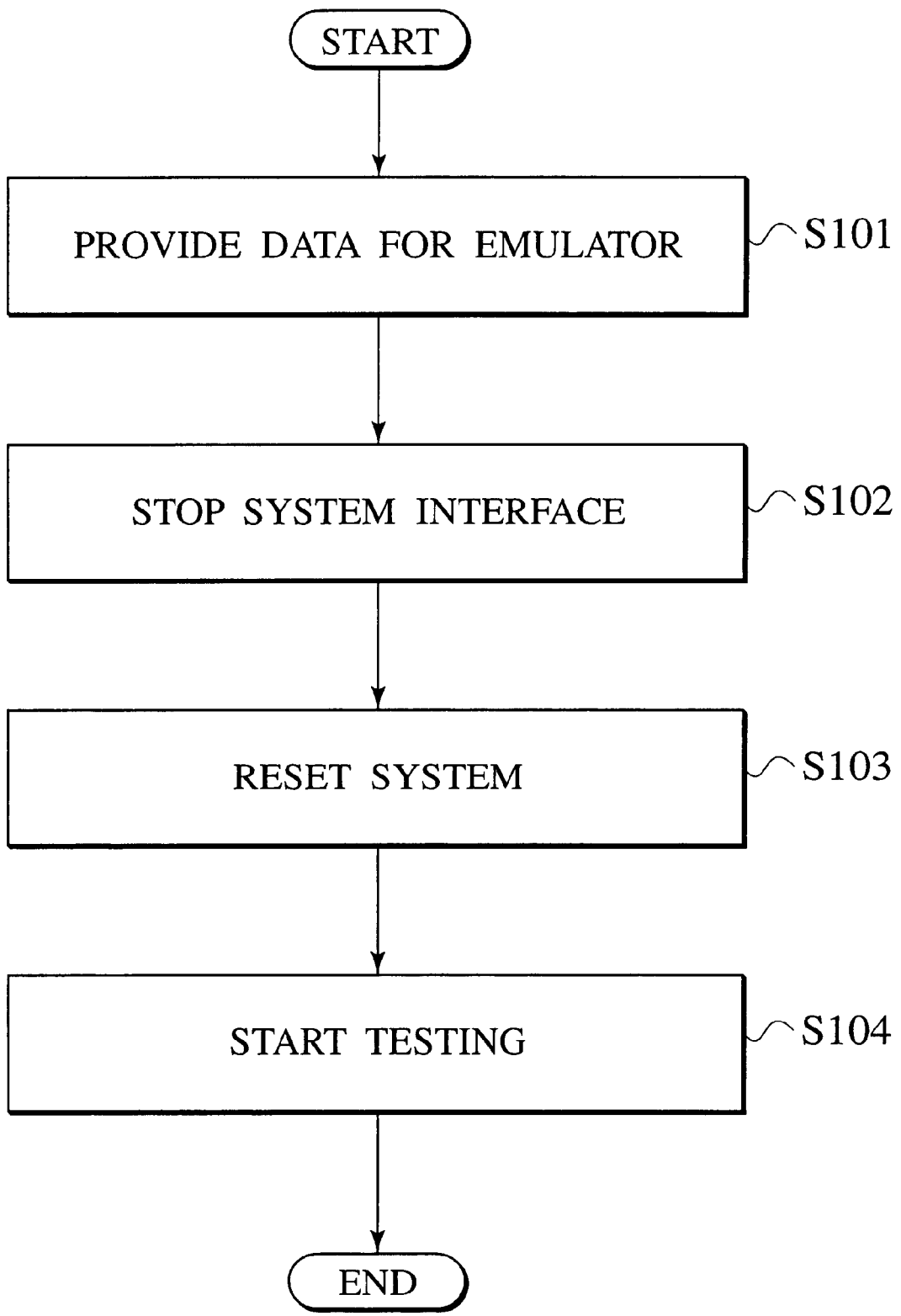
FIG. 4 illustrates a flow chart of a tester 2 according to the embodiment of the present invention.

FIG. 4 illustrates a flow chart of the method of emulation for testing a system according to the embodiment of the present invention. Before the testing, the CPU 3 accesses data from an external memory via the RAMBUS I/F 4 or the DRAM I/F 5. The tester 2 provides data for the emulator 6 via the bus D11 (step S101). Next, the emulator 6 sends control signals A and B to the RAMBUS I/F 4 and the DRAM I/F 4 so that these interfaces are suspended during the testing (step S102). Next, the data processing system 1 is reset, if necessary (step S103), and then the tester 2 starts testing (step S104). During the testing, the CPU 3 accesses data from the emulator 6 since the data were provided for the emulator 6 at the step S101 and the RAMBUS I/F 4 and the DRAM I/F 5 are suspended. The emulator 6 inputs and outputs required data from the CPU 3 during the testing since it is not necessary to test using buses such as the RAMBUS I/F 4 and the DRAM I/F 5. Therefore, the testing can be realized under the system regulation frequency or less without using high-performance and expensive tester.

Figure 5:
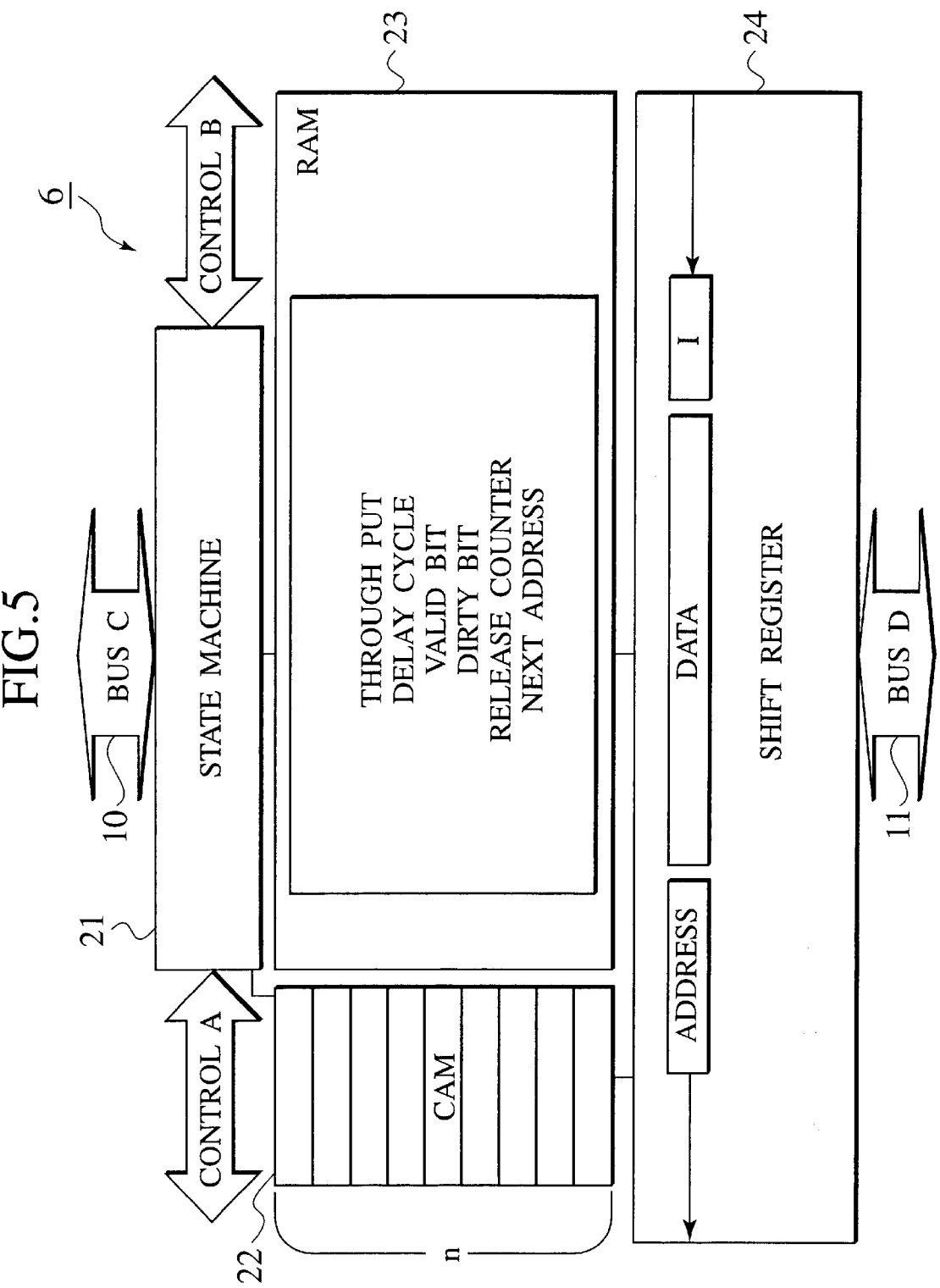
FIG. 5 illustrates the emulator shown in FIG. 3 according to the embodiment of the present invention.

FIG. 5 illustrates the emulator 6 shown in FIG. 3 according to the embodiment of the present invention. The emulator 6 comprises a content addressable memory (CAM) configured to store addresses accessed by a system to be tested, a memory unit having storage area corresponding to the entry of the CAM, configured to store data corresponding to the address stored in the CAM, and test information for emulation, a shift register configured to store data and test information from a tester and transfer the data and the test information to the CAM and the memory unit, and a state machine configured to receive a request from a system or a tester and control transferring between a system and a tester.

The state machine 21 controls the interfaces of the bus C10 and the bus D11, and generates control signals A and B. Then the state machine 21 outputs these signals to the system interfaces such as the RAMBUS I/F 4 or the DRAM I/F 5. Also the state machine 21 receives an access request from the data processing system 1, and outputs the result to the data processing system 1 with controlling the CAM 22 and the RAM 23. The CAM 22 stores addresses in the address space of the data processing system 1 and the data processing system 1 can access the addresses since the CAM 22 has a compared association function. If the requested address is located in the CAM 22, then data of the address is read out from the RAM 23 or stored to the RAM 23. For the expansion of the systems, it is difficult that localization of the test program, i.e., to concentrate program in the continuous addresses is difficult since address space is also expanding so that the data tend to be stored scatteredly in a storage device. However the use of the CAM 22 compensates for this problem of the scattered addresses.

The RAM 23 stores data transmitted between the data processing system 1 and the tester 2, and test information used in testing of the data processing system 1. The test information includes, but not limited to, information of delay cycle, throughput, valid bit, dirty bit, next address for emulating such as buses, and release counter for every memory line for releasing the memory line if the number of use times exceeds the number of scheduled times. Furthermore, the CAM 22 and the RAM 23 have a plurality of memory lines, and each memory line of the RAM 23 stores the test information mentioned-above such as delay circle.

Where the delay cycle is an interval between the request of access and the starting of actual output. The throughput is a period from the receiving the request to the transferring the answer of the request. The valid bit is a bit which indicates whether the data is valid or not. The bit "on" or "1" indicates that the data is valid. The bit is turned "off" or "0" that indicates the data is invalid if the release counter is turned "0". In this case, the entry of the valid bit turns to be writable. The dirty bit is a bit which indicates whether data is updated by a writing operation or not. The bit is turned "1" if data in the RAM 23 is updated. And lines whose dirty bit is "1" when the test is completed are used as a flag which indicates whether the data is transferred or not. The release counter stores the number of data's access times that was obtained by simulations. The value of the release counter decreases "1" if there is a reading operation at the line. The valid bit is turned "0" when the value of the release counter becomes "0" except the dirty bit is "on". If the next address is set, the next data is provided according to the set address. The shift register 24 temporarily stores information of the address, data, and information from the tester 2 via the bus D11. The information is transferred to the CAM 22 and the RAM 24. And the shift register 24 reads lines that there was a writing operation in the CAM 22 and the RAM 23 to output the data to the tester 2 via the bus D1.

Next, the operation of the emulator in testing will be explained herein below. The tester 2 controls the shift register 24 to initialize data in the shift register 24. The data processing system 1 may send data serially using the shift register 24 if there is a problem about shortage of the number of pins. On the other hand, High-speed data transmission will be realized by introducing encode-decode logic to compress or decompress signals. The shift register 24 sends transferred data to lines whose valid bit is "off" in the RAM 23. These operations will be repeated while the data last or the number of entry reaches the maximum number of use. After that the data processing system 1 is reset by the tester 2, and the data processing system is starting up. Here, if the request from CPU 3 is the reading operation, then the request that the CPU 3 reads data from an address is submitted to the state machine 21 via the bus C10. At this time, other interfaces both the RAMBUS I/F 4 and the DRAM I/F 5 are suspended. The state machine 21 detects a line corresponding to the address in the CAM 22, and reads data corresponding to the address in the RAM 23. The state machine 21 also reads the test information that are valid bit, dirty bit, throughput, release counter, and next address.

The emulator 6 controls the bus A8 and C10 to behave as if there is a memory connecting to the I/F such as the RAMBUS 4 based on the read-out information from the RAM 23. The CPU receives the data based on the read-out information via the bus C10. In case of continuous access such as burst transmission or DMA (Direct Memory Access), the emulator transfers the data based on the information of the next address to read next line. In another case that CPU requests writing operation, the state machine 21 receives the request including address which CPU 3 accesses via the bus A8 and the C10. At this time, other interfaces such as RAMBUS I/F are suspended. The state machine 21 detects a line corresponding to the address in the CAM 22, and writes the data corresponding to the address in the RAM 23. If there is no corresponding line in the CAM 22, the state machine 21 writes the address, the data, and sets the dirty bit "on" to the entry whose valid bit is "0". After the testing, the shift register 24 inputs data from lines whose valid bit is "1" in the RAM 23. The writing information in the RAM 23 are transferred to the tester 2 that is outside of the data processing system 1.

It is preferred that the number of the uses in each line in the RAM 23 is obtained by computer simulations. The value of the release counter decreases "1" if the line in the RAM 23 is read. And the data in the line is treated as invalid data if the value becomes "0" so that the tester 2 can transfer other data to the line. In this way, more data than the capacity of RAM 23 can be stored by using this. On the other hand, it is preferred that the CAM 23 has decoding function that the data address in the CAM 22 is modifiable so that the RAM 23 can be used as a ordinary RAM instead of this testing.

Figure 6:
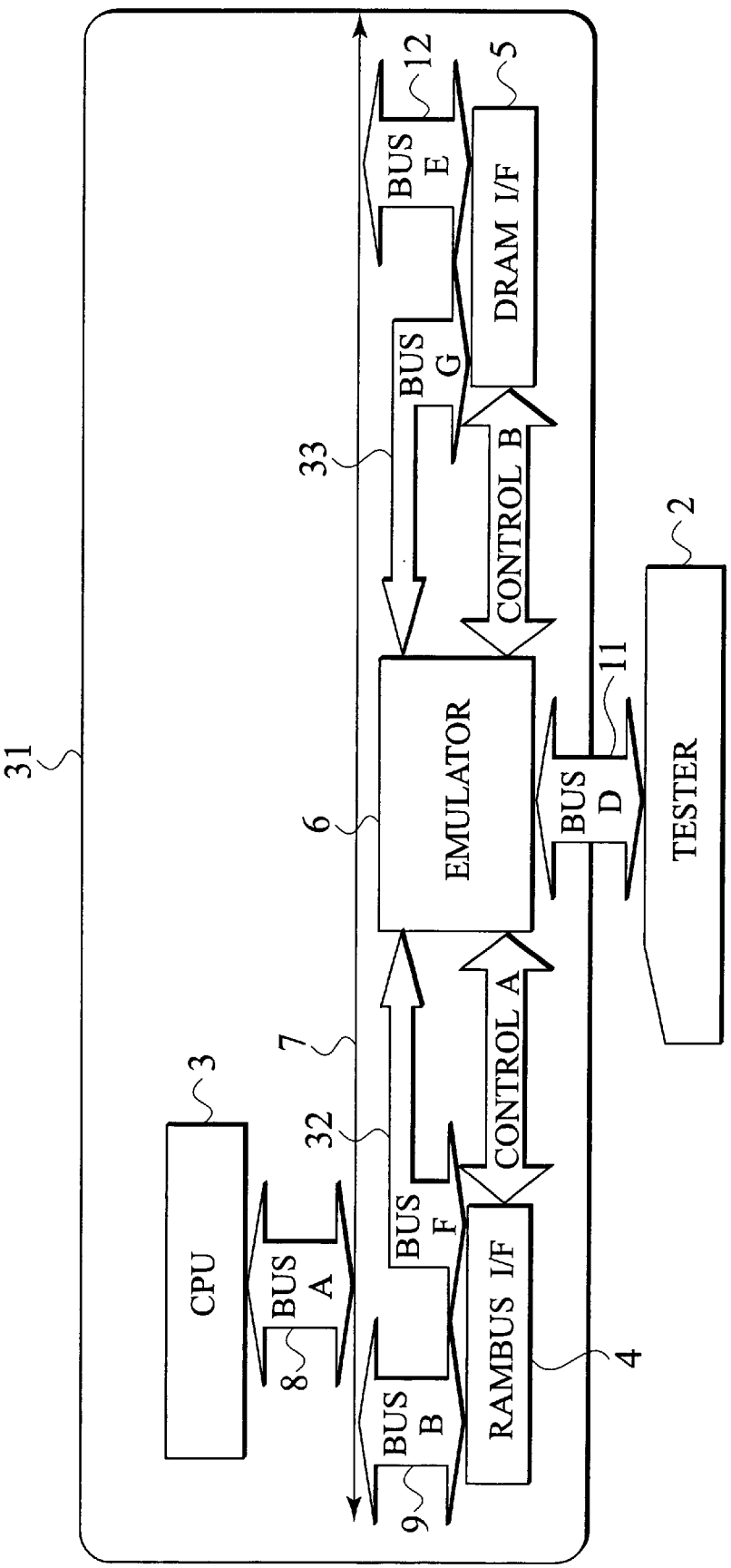
FIG. 6 illustrates a data processing system having an emulator according to another embodiment of the present invention.

FIG. 6 illustrates a data processing system having an emulator according to another embodiment of the present invention. This data processing system further comprises a bus F32 connecting the RAMBUS I/F 4 and the emulator 6, a bus G33 connecting the DRAM I/F and the emulator 6, instead of the bus C11 compared with FIG. 3. According to this embodiment, the emulator 6 and these system interfaces such as the RAMBUS I/F 4 or the DRAM I/F 5 communicate each other via the bus F32 or G33. The request from the CPU 3 and the transmission data to the system bus 7 are received by the emulator via the system interfaces such as the RAMBUS I/F 4 or the DRAM I/F 5. According to this embodiment of the present invention, not only the same or similar results above embodiment, but also more accurate tests are realized.

As explained above, the present invention is capable of stable testing can be realize under the system regulation frequency or less frequency without using the high-performance and expensive tester.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A data processing system, comprising:
   a CPU configured to request data to be processed;
   a system interface electrically coupled to the CPU, the system interface configured to transfer the data from an external circuit connectable to the data processing system to the CPU, the system interface configured to transfer the data from an emulator to the CPU based on a control signal;
   the emulator electrically coupled to the system interface, the emulator configured to send the control signal to the system interface, the emulator configured to substitute for the external circuit connectable to the data processing system in testing, the emulator configured to receive a request from the CPU via the system interface to output data corresponding to the request to the CPU in testing, the emulator comprising:
      a content addressable memory (CAM) configured to store addresses accessed by the system to be tested;
      a memory unit having storage area corresponding to the entry of the CAM, the memory configured to store data corresponding to the address stored in the CAM and test information for emulation;
      a shift register configured to store data and test information from a tester connectable to the data processing system to transfer the data and the test information to the CAM and the memory unit; and
      a state machine configured to receive a request from the CPU or a tester and to control transferring between the CPU and a tester, the state machine configured to generate the control signal to output to the system interface.

2. The data processing system claimed in claim 1, wherein the emulator is incorporated into the data processing system.

3. The data processing system claimed in claim 1, wherein the CAM stores a part of address of the system.

4. The data processing system claimed in claim 3, wherein the memory unit stores data corresponding to the address stored in the CAM, and output the requested data to the system.

5. The data processing system claimed in claim 1, wherein the test information is the information about data transferring to the system.

6. An emulator for testing a system, comprising:
   a content addressable memory (CAM) configured to store addresses accessed by the system to be tested;
   a memory unit having storage area corresponding to the entry of the CAM, configured to store data corresponding to the address stored in the CAM and test information for emulation;
   a shift register configured to store data and test information from a tester and transfer the data and the test information to the CAM and the memory unit; and
   a state machine configured to receive a request from a system or a tester and control transferring between a system and a tester,
   wherein the test information is the information about data transferring to the system,
   wherein the test information includes:
      delay cycle that is an interval between the request of access and the starting of actual output;
      throughput that is a period from the receiving the request to the transferring the answer of the request;
      valid bit which is a bit which indicates whether the data is valid or not;
      dirty bit which is a bit that indicates whether the data is updated by a writing operation or not;
      release counter that stores the number of access times.

7. The emulator claimed in claim 6, wherein the emulator controls data transferring to the system as if there is a memory based on the test information.

8. The emulator claimed in claim 6, wherein the state machine treats as a writable area if the number of access times reaches the access time of the area stored in the release counter.

9. The data processing system claimed in claim 5, wherein the test information includes next address that stores next address.

10. The data processing system claimed in claim 1, wherein the CAM has a function that data address in the CAM is modifiable so that the RAM is used as an ordinary RAM.

11. A method of emulation for testing a system, comprising the steps of:
   providing data requested by a CPU in the system via a system interface for an emulator;
   suspending transferring data of the system interface to an external circuit connectable to the system, the system interface transfers data to the emulator, the switching is made based on control signal outputted by the emulator; and
   testing the system using the data provided for the emulator.

12. The method of emulation claimed in claim 10, wherein the provided data for the emulator are the information about data transferring to the system.

13. A method of emulation for testing a system, comprising:

providing data for an emulator;

suspending system interface by control signal outputted by the emulator; and testing the system using the data provided for the emulator and test information, wherein the test information includes:

delay cycle that is an interval between the request of access and the starting of actual output;

throughput that is a period from the receiving the request to the transferring the answer of the request;

valid bit which is a bit which indicates whether the data is valid or not;

dirty bit which is a bit that indicates whether the data is updated by a writing operation or not;

release counter that stores the number of access times.

14. The method of emulation claimed in claim 12, wherein the emulator controls data transferring to the system as if there is a memory based on the test information.

15. The method of emulation claimed in claim 13, wherein the state machine treats as a writable area if the number of access times of the area reaches the access time stored in the release counter.

\* \* \* \* \*